US010336121B2

(12) United States Patent
Katsumoto et al.

(10) Patent No.: US 10,336,121 B2
(45) Date of Patent: Jul. 2, 2019

(54) LENTICULAR PRINTED MATERIAL

(71) Applicant: FUJIFILM CORPORATION, Minato-ku, Tokyo (JP)

(72) Inventors: Ryuichi Katsumoto, Shizuoka (JP); Ryou Hibino, Shizuoka (JP); Yanlong Che, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/854,002

(22) Filed: Dec. 26, 2017

(65) Prior Publication Data

US 2018/0117943 A1 May 3, 2018

Related U.S. Application Data

(63) Continuation of application No. PCT/JP2016/069722, filed on Jul. 1, 2016.

(30) Foreign Application Priority Data

Jul. 3, 2015 (JP) ................................ 2015-134789

(51) Int. Cl.
*G02B 27/10* (2006.01)
*B42D 15/02* (2006.01)
(Continued)

(52) U.S. Cl.
CPC ............. *B42D 15/02* (2013.01); *B42D 15/00* (2013.01); *B42D 25/23* (2014.10); *B42D 25/324* (2014.10);
(Continued)

(58) Field of Classification Search
CPC ........ G02B 3/005; G02B 3/0037; G02B 3/06; G02B 27/0966; G02B 2003/0093
(Continued)

(56) References Cited

U.S. PATENT DOCUMENTS 6,817,530 B2 11/2004 Labrec et al.
2013/0154250 A1 6/2013 Dunn et al.

FOREIGN PATENT DOCUMENTS

EP 0037270 A1 3/1981
JP S47-12897 U 10/1972
(Continued)

OTHER PUBLICATIONS

Extended European Search Report dated Feb. 1, 2018, issued in corresponding EP Patent Application No. 16821353.6.
(Continued)

*Primary Examiner* — William Choi
(74) *Attorney, Agent, or Firm* — Solaris Intellectual Property Group, PLLC

(57) ABSTRACT

Provided is a lenticular printed material including: a lenticular lens in which a plurality of convex lenses respectively having a semicylindrical surface are arranged in parallel; and a lenticular image which is disposed on a side opposite to the semicylindrical surface of each convex lens and includes character information to be displayed in a plurality of languages independently from each other, in which the languages for displaying the character information are switched between one another according to an observation angle in a case where the lenticular image is observed through the lenticular lens.

15 Claims, 5 Drawing Sheets

(51) Int. Cl.

| | |
|---|---|
| ***B42D 15/00*** | (2006.01) |
| ***G09F 19/12*** | (2006.01) |
| ***B42D 25/425*** | (2014.01) |
| ***B42D 25/23*** | (2014.01) |
| ***B42D 25/324*** | (2014.01) |
| ***B42D 25/351*** | (2014.01) |
| ***G09F 19/14*** | (2006.01) |

(52) U.S. Cl.
CPC ......... *B42D 25/351* (2014.10); *B42D 25/425* (2014.10); *G09F 19/12* (2013.01); *G09F 19/14* (2013.01)

(58) Field of Classification Search
USPC ................................ 359/619, 622, 623, 710
See application file for complete search history.

(56) References Cited

FOREIGN PATENT DOCUMENTS

| | | | | |
|---|---|---|---|---|
| JP | H07-160212 | A | | 6/1995 |
| JP | 3103965 | U | * | 8/2004 |
| JP | 3103965 | U | | 8/2004 |
| JP | 2005-208118 | A | | 8/2005 |
| JP | 2008-077711 | A | | 4/2008 |
| JP | 1400591 | | | 11/2010 |
| WO | 02/40291 | A2 | | 5/2002 |

OTHER PUBLICATIONS

English language translation of the following: Office action dated Aug. 28, 2018 from the JPO in a Japanese patent application No. 2015-134789 corresponding to the instant patent application.

Kayo Tokyo Eigyosho, Lenticular Insatsu Jikokuhyo Changing! Kayo Insatsu, [online], YouTube, Aug. 9, 2014 (Aug. 9, 2014), YouTube, [retrieved on Sep. 1, 2016 (Sep. 1, 2016)]].

International Search Report issued in International Application No. PCT/JP2016/069722 dated Sep. 13, 2016.

Written Opinion of the ISA issued in International Application No. PCT/JP2016/069722 dated Sep. 13, 2016.

English language translation of the following: Office action dated Jan. 29, 2019 from the JPO in a Japanese patent application No. 2015-134789 corresponding to the instant patent application.

* cited by examiner

FIG. 5A
FIG. 5B
NIHON
〒 100-0000 東京都商標市意匠町100
Tel. 03-1234-0000 Fax. 03-1234-1111
E-mail : taro-tokkyo@nihon.co.jp
NIHON
TARO TOKKYO
MANAGER
INTELLECTUAL PROPERTY DIV.
NIHON Corporation
100 ISHO-MACHI, SHOHYO-SHI
TOKYO, 100-0000, JAPAN
Tel. +81-3-1234-0000 Fax. +81-3-1234-1111
E-mail : taro-tokkyo@nihon.co.jp

LENTICULAR PRINTED MATERIAL

CROSS-REFERENCE TO RELATED APPLICATION

This application is a Continuation of International Application No. PCT/JP2016/069722, filed Jul. 1, 2016, which claims priority to Japanese Patent Application No. 2015-134789 filed Jul. 3, 2015. Each of the above applications is hereby expressly incorporated by reference, in its entirety, into the present application.

BACKGROUND OF THE INVENTION

1. Field of the Invention

The present invention relates to a lenticular printed material.

2. Description of the Related Art

With the progression of internationalization, there are cases where character information is required to be displayed in a plurality of languages at the time of displaying an image including the character information by printing the image on a recording medium such as paper.

For example, in a case of a business card, a business card formed by displaying character information such as an affiliated organization name, a name, or an address in different languages from each other on both surfaces (for example, the character information is written in Japanese on one surface and English on the other surface) or a business card formed by displaying character information in a plurality of languages on one surface by reducing the size of characters has been used. Alternatively, there are cases where business cards are prepared for each language used by a client and business cards to be handed over are properly used according to a business partner to be dealt with.

Design Registration No. 1400591 discloses a business card formed in a booklet shape as an example of a business card which can display many items of information.

Without limitation to business cards, it is desired that notices or menus in places where there are many visitors from foreign counties, for example, airports, stations, department stores, convenience stores, restaurants, and sightseeing resorts are displayed in a plurality of languages so that visitors from abroad can understand the contents.

Further, it is desired that character information is displayed in a plurality of languages even in countries or regions where a plurality of ethnic groups using different languages are living.

SUMMARY OF THE INVENTION

In a case where character information is displayed in a plurality of languages, for example, it is necessary to reduce the size of characters as the number of languages to be displayed is increased at the time of writing the contents in a plurality of languages on a surface of one sheet of paper. Particularly in a case where the size of the surface of the paper is limited, as in a business card, the legibility of characters is significantly degraded because the size of characters needs to be reduced significantly at the time of displaying the contents in a plurality of languages on one surface or the characters need to be densely printed on the surface of the paper. Therefore, it is difficult to display the contents in three or more languages with high legibility in one sheet of business card.

For example, in the business card formed in a booklet shape as disclosed in Design Registration No. 1400591, displaying the contents in different languages on each page can also be considered, but it is inconvenient for a user and a recipient of the business card to carry and keep the business card because of the bulkiness.

For example, in regard to notices such as posters, a method of changing the language to be displayed using an electronic medium such as a liquid crystal panel may be employed. However, a display device and a power source are required, the installation location is limited, and the display device is expensive.

An object of an embodiment of the present invention is to provide a printed material which is capable of displaying character information in a plurality of languages with high legibility, is not bulky, can be used in any place, and can be produced at a low price.

Means for achieving the above-described object includes the following embodiments.

<1> A lenticular printed material comprising: a lenticular lens in which a plurality of convex lenses respectively having a semicylindrical surface are arranged in parallel; and a lenticular image which is disposed on a side opposite to the semicylindrical surface of the convex lens and includes character information to be displayed in a plurality of languages independently from each other, in which the languages for displaying the character information are switched between one another according to an observation angle in a case where the lenticular image is observed through the lenticular lens.

<2> The lenticular printed material according to <1> which is a business card.

<3> The lenticular printed material according to <1> or <2>, in which the character information is displayed in three or more languages that are switched between one another according to the observation angle.

<4> The lenticular printed material according to any one of <1> to <3>, in which the lenticular image has common items common between at least two languages among the plurality of languages, and the common items are displayed at the same position between at least two languages having the common items at the time of changing the observation angle.

<5> The lenticular printed material according to any one of <1> to <4>, in which at least 100 columns of the convex lenses constituting the lenticular lens are arranged in parallel per 2.54 cm.

<6> The lenticular printed material according to any one of <1> to <5>, in which the lenticular lens and the lenticular image are provided on both surfaces of the lenticular printed material, and the languages for displaying the character information are switched between one another according to the observation angle respectively on the both surfaces.

<7> The lenticular printed material according to any one of <1> to <6>, in which paper is attached to a surface on the side opposite to the semicylindrical surface of the convex lens of the lenticular lens.

<8> The lenticular printed material according to <6> or <7>, in which the lenticular lens and the lenticular image are provided on the both surfaces, the lenticular image on one surface includes character information displayed in three languages which are switched to first to third languages according to the observation angle, and the lenticular image on the other surface includes character information displayed in three languages which are switched to fourth to sixth languages respectively different from the first to third languages according to the observation angle.

According to an embodiment of the present invention, it is possible to provide a printed material which is capable of displaying character information in a plurality of languages with high legibility, is not bulky, can be used in any place, and can be produced at a low price.

DESCRIPTION OF THE PREFERRED EMBODIMENTS

Figure 1A:
FIG. 1A is a view schematically illustrating an example of displaying a first language on a business card that displays the contents in three languages switched between one another according to an observation angle as an example of a lenticular printed material according to an embodiment of the present invention.

Hereinafter, an embodiment of the present invention will be described in detail with reference to the accompanying drawings. Further, the same members are denoted by the same reference numerals throughout all drawings and the description thereof will not be provided.

A lenticular printed material according to an embodiment of the present invention includes a lenticular lens in which a plurality of convex lenses respectively having a semicylindrical surface are arranged in parallel; and a lenticular image which is disposed on a side opposite to the semicylindrical surface of each convex lens and includes character information to be displayed in a plurality of languages independently from each other, in which the languages for displaying the character information are switched between one another according to an observation angle in a case where the lenticular image is observed through the lenticular lens.

Since the display languages of the lenticular printed material according to the embodiment of the present invention are switched between one another according to change in observation angle, there is no need to reduce the size of characters of each language or enlarge the recording medium itself even though the amount of information is increased due to the display in a plurality of languages, compared to typical business cards that display the contents in one language. Accordingly, the character information can be displayed in a plurality of languages with high legibility even in a case where the size of the display surface is reduced as in a business card.

In addition, since the display languages of the lenticular printed material according to the embodiment of the present invention can be switched between one another in one sheet using the observation angle, the lenticular printed material is not bulky like a booklet, an electronic medium such as a liquid crystal panel and a power source are unnecessary, the production can be made at a low price, and the location for using the lenticular printed material is also not limited. Therefore, the lenticular printed material according to the embodiment of the present invention can be suitably used as a small-sized printed material to be handed over to a partner as in a business card or to be put in a pocket or the like in clothes so as to be carried.

Hereinafter, a business card which is an example of the lenticular printed material according to the embodiment of the present invention will be described. Further, the lenticular printed material according to the embodiment of the present invention is not limited to a business card and can be applied without particular limitation as long as the printed material includes character information.

Figure 1B:
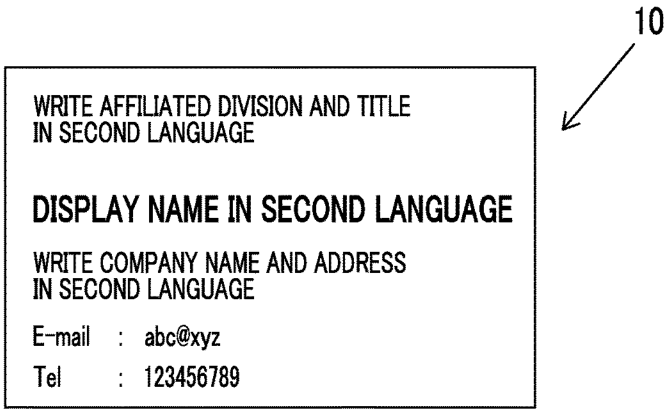
FIG. 1B is a view schematically illustrating an example of displaying a second language on a business card that displays the contents in three languages switched between one another according to an observation angle as an example of the lenticular printed material according to the embodiment of the present invention.
Figure 1C:
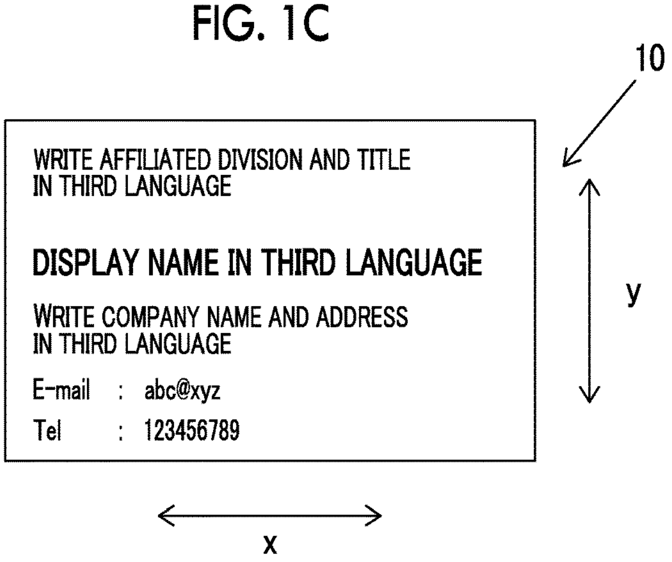
FIG. 1C is a view schematically illustrating an example of displaying a third language on a business card that displays the contents in three languages switched between one another according to an observation angle as an example of the lenticular printed material according to the embodiment of the present invention.

FIGS. 1A, 1B, and 1C are views schematically illustrating a business card 10 (hereinafter, also referred to as a "lenticular business card") which is an example of the lenticular printed material according to the embodiment of the present invention. A business card typically includes character information such as the name of a user, the name of the affiliated organization, the title, the address, the phone number, the FAX number, the E-mail address, and URL. The lenticular business card illustrated in FIGS. 1A, 1B, and 1C is configured such that the character information is displayed in three languages (the first language, the second language, and the third language) that are switched between one another according to the observation angle.

Hereinafter, the configuration of the lenticular printed material according to the embodiment of the present invention will be described in detail.

(Lenticular Lens)

The lenticular lens (hereinafter, also referred to as a lenticular sheet) has a configuration in which a plurality of convex lenses respectively having a semicylindrical surface are arranged in parallel on a side where the lenticular printed material according to the embodiment of the present invention is observed and is formed of a resin having a light-transmitting property.

A method of producing a lenticular lens is not particularly limited. For example, a resin having a light-transmitting property is melted and extruded in a sheet shape and emboss processing or the like is performed on one surface thereof to form a lenticular lens in which convex lenses are arranged in parallel.

Examples of the resin that forms a lenticular lens include a polymethyl methacrylate resin (PMMA), a polycarbonate resin, a polystyrene resin, a methacrylate-styrene copolymer resin (MS resin), an acrylonitrile-styrene copolymer resin (AS resin), a polypropylene resin, a polyethylene resin, a polyethylene terephthalate resin, a glycol-modified polyethylene terephthalate resin, a polyvinyl chloride resin (PVC), a thermoplastic elastomer, and a cycloolefin polymer.

From the viewpoint of easily performing melt extrusion, it is preferable to use a resin having a low melt viscosity, such as a polymethyl methacrylate resin (PMMA), a polycarbonate resin, a polystyrene resin, a methacrylate-styrene copolymer resin (MS resin), a polyethylene resin, a polyethylene terephthalate resin, or a glycol-modified polyethylene terephthalate resin.

From the viewpoint that the lens shape formed on the surface of an embossing roller is easily transferred during the formation of convex lenses by performing the emboss processing and the lenses are unlikely to be cracked during the emboss processing, it is more preferable to use a glycol-modified polyethylene terephthalate resin.

Further, amorphous PET may be used as a polyethylene terephthalate (PET) resin.

In addition, the lenticular lens according to the embodiment of the present invention may be formed by containing a plurality of resins.

The width of one convex lens constituting the lenticular lens is not particularly limited, and the pitch width of a lens may be selected depending on the purpose. Typically, the line per inch (LPI) representing the number of convex lenses per 1 inch (2.54 cm) is frequently used. 100 LPI indicates that 100 sheets (100 columns) of convex lenses are present per 1 inch, and the pitch of the lenses is 254 μm. The pitch of the lenses decreases as the number of lines increases, and thus the definition is improved.

A lenticular sheet (for example, 60 LPI) with a low definition is suitable to be used for a poster or the like that displays a drawing pattern which is observed at a position relatively far from the poster. However, in a case where the purpose thereof is for character information displayed using small characters, such as a business card, to be read, it is preferable that at least 100 columns of convex lenses constituting the lenticular lens are arranged in parallel per 2.54 cm (1 inch). In addition, from the viewpoint of the resolution of the lenticular image, it is more preferable that the number of columns of convex lenses constituting the lenticular lens is 200 columns (200 LPI) or less per 2.54 cm.

(Lenticular Image)

The lenticular image is disposed on a side opposite to the semicylindrical surface of each convex lens in the lenticular printed material and includes character information to be displayed in a plurality of languages independently from each other. The lenticular image is formed such that the languages for displaying the character information are switched between one another according to the observation angle in a case where the lenticular image is observed through the lenticular lens.

The lenticular image according to the embodiment of the present invention may be printed on a surface on the side opposite to the semicylindrical surface of each convex lens of the lenticular lens or the lenticular image printed on a recording medium such as paper may be attached to a smooth surface side of the lenticular lens through an adhesive layer having a light-transmitting property.

A method of forming a lenticular image is not particularly limited, and examples thereof include offset printing and inkjet printing. From the viewpoint of on-demand, inkjet printing is preferable.

Regardless of which printing method is employed, the number of dots to be printed in formation of the lenticular image is preferably less than or equal to (the pitch of convex lenses/the number of image columns per one lens). For example, in a case where 12 columns of images are formed for each lens in 100 LPI of lenses (lens pitch: 254 μm), the diameter of each dot is preferably less than or equal to (254 μm/12≈21 μm). An image to be displayed becomes clearer as the diameter of each dot decreases, and the afterimage feeling and the sharpness during the switching are improved.

For example, in a case of a business card, the name is frequently displayed with the largest characters. In such a case, in order to reduce the afterimage feeling, it is preferable to use a Mincho style font or the like which has a narrow line width without using a Gothic style font or the like which has a thick line width.

In a case where the lenticular image is printed directly on the rear surface (smooth surface) of the lenticular lens, the legibility of character information is degraded in some cases because the background scenery of the lenticular printed material is transparent at the time of observation from the lenticular lens side. Further, in a case where the lenticular image is in a state of being exposed to the surface, the lenticular image is peeled off due to rubbing or the like so that the legibility is likely to be degraded. Accordingly, it is preferable that a protective layer for protecting the lenticular image is provided on the surface (smooth surface) on which the lenticular image of the lenticular lens is formed in the case where the lenticular image is printed directly on the rear surface (smooth surface) of the lenticular lens. Examples of the protective layer include paper, a resin film, a metal sheet, and styrene foam. Further, the rear surface of the lenticular image may be coated with, for example, a white paint and then dried to provide a protective layer.

The region (background) other than the portion where an image of character information or the like is formed may be a white background like a typical business card. Alternatively, in order to reduce the afterimage feeling of characters or an image other than the characters during the switching, the region may be colored or provided with a pattern to the extent that the reading of characters is not disturbed.

Moreover, in a case where paper is attached to the surface on a side (smooth surface side) opposite to the semicylindrical surface of each convex lens of the lenticular lens, the lenticular image in which the languages for displaying character information are switched between one another may be formed on the smooth surface of the lenticular lens or on paper.

Figure 2:
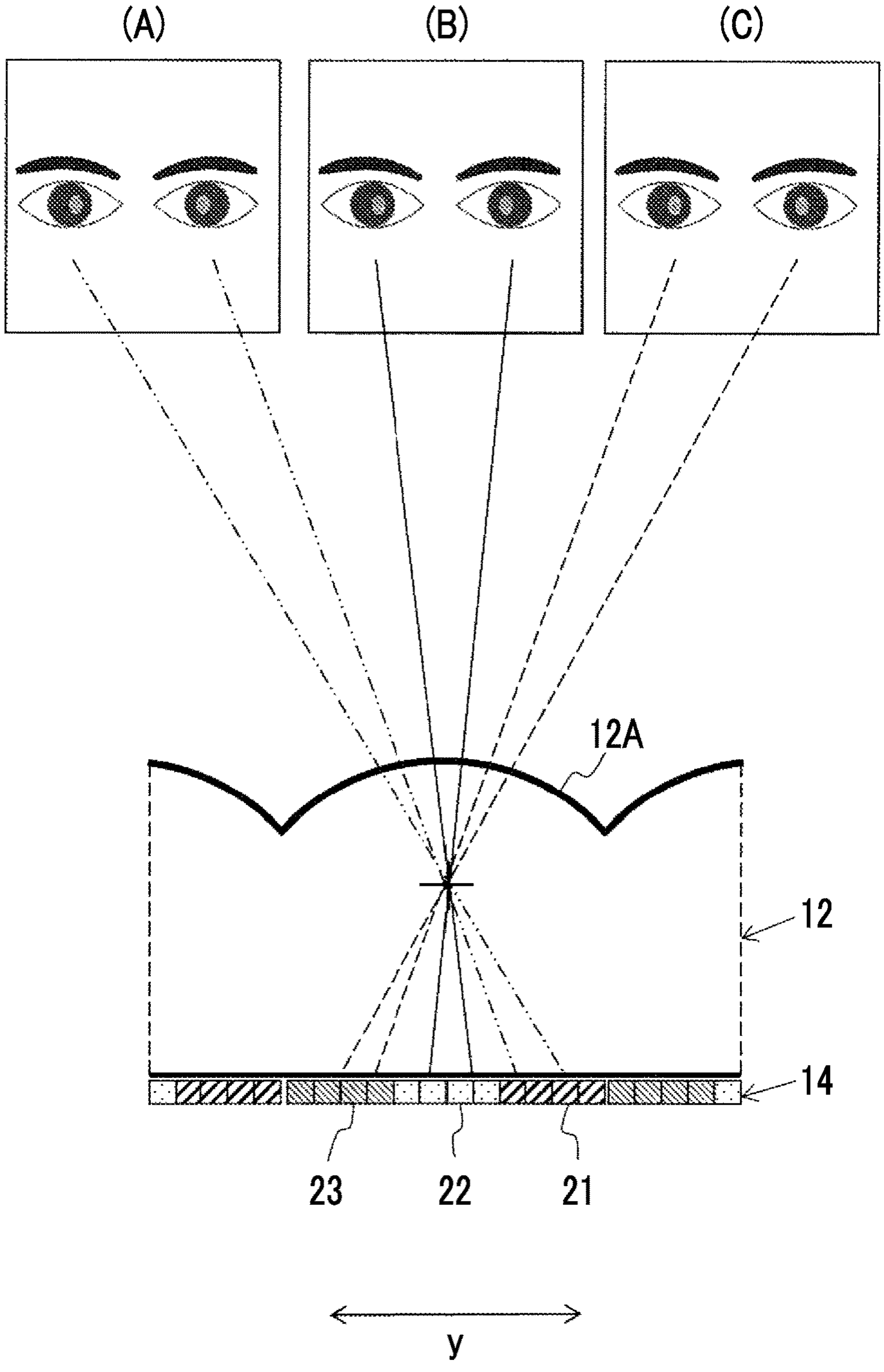
FIG. 2 is a view schematically illustrating an example of arrangement of image columns arranged under one lens in the lenticular printed material according to the embodiment of the present invention.

FIG. 2 is a view schematically illustrating an example of a convex lens in a portion of the lenticular printed material according to the embodiment of the present invention and the arrangement of image columns constituting each display language. In the lenticular printed material illustrated in FIG. 2, image columns 21 for the first language, image columns 22 for the second language, and image columns 23 for the third language forming a lenticular image 14 are respectively arranged in parallel with the longitudinal direction (direction perpendicular to an arrangement direction y of a convex lens 12A on the smooth surface of the lenticular lens 12) of the convex lens 12A, on the smooth surface side of the lenticular lens 12. The image columns for each language are arranged in the width direction of the convex lens 12A by respectively forming a group (image column group) of four image columns under one convex lens 12A.

By arranging image columns respectively in correspondence with three languages under each convex lens 12A in the above-described manner, only the image columns for the first language are visually synthesized as character information at the time of observation performed by an observer at an angle at which the image columns 21 for the first language arranged under each convex lens enter the field of view through the lenticular lens 12. In this manner, the observer is capable of reading the character information displayed in the first language as illustrated in (A) of FIG.

1A. The same applies to the cases of the image columns 22 for the second language and the image columns 23 for the third language, and the character information displayed in each language can be read as illustrated in (B) of FIG. 1B and (C) of FIG. 1C by performing observation at an angle at which the image columns for each language arranged under each convex lens enter the field of view so that the image columns are synthesized.

Figure 3:
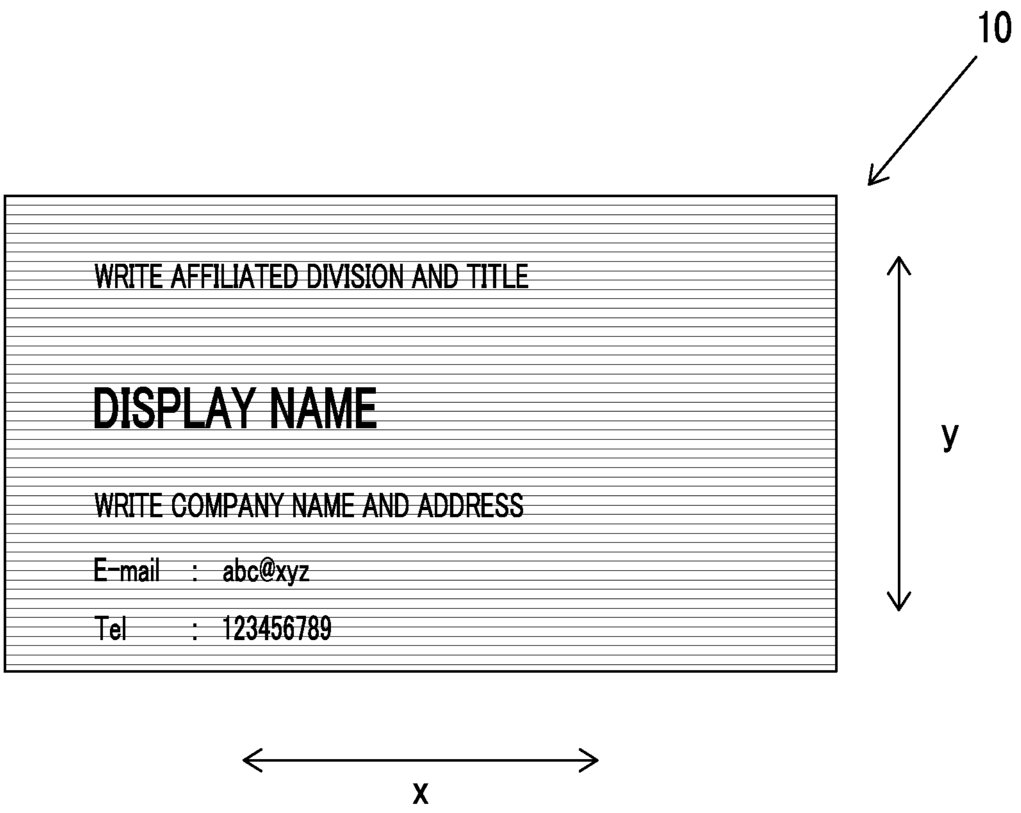
FIG. 3 is a view schematically illustrating an example of disposition of a lenticular lens in the lenticular printed material according to the embodiment of the present invention.
Figure 4:
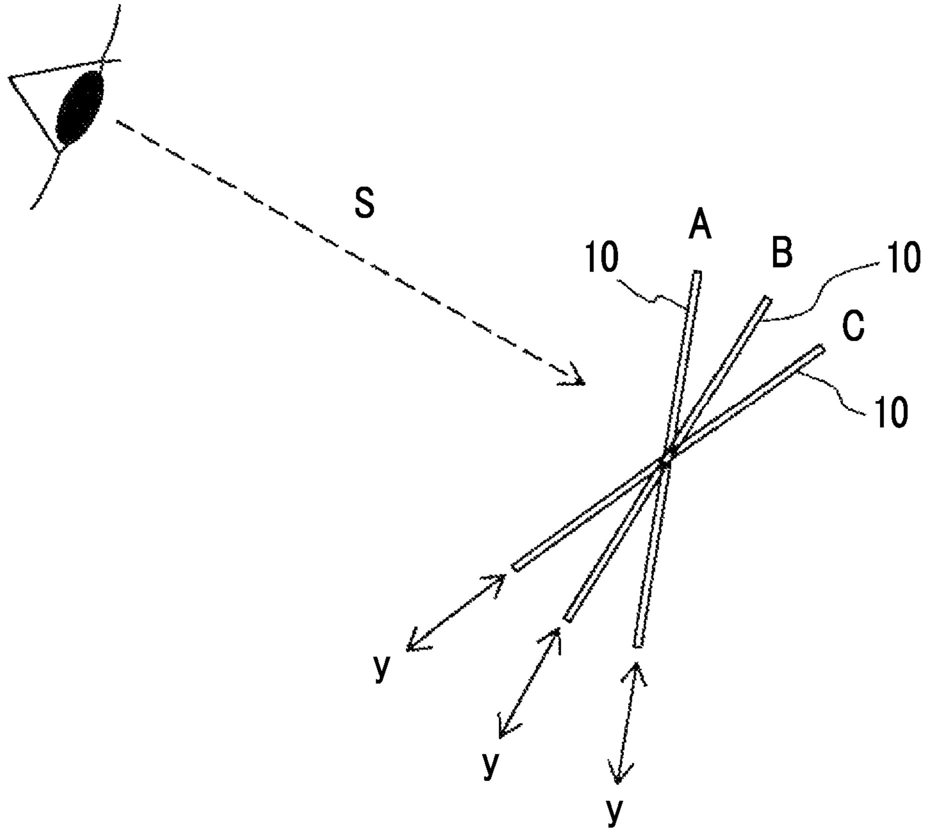
FIG. 4 is a view schematically illustrating an example of change in observation angle of the lenticular printed material according to the embodiment of the present invention.

Further, the longitudinal direction of each convex lens 12A constituting the lenticular lens 12 and the longitudinal direction of each image column may be in parallel with or perpendicular to each other, but it is preferable that the longitudinal direction of each convex lens 12A and the longitudinal direction of each image column are disposed in parallel with each other. For example, as illustrated in FIG. 3, in a case where character strings in each display language are arranged in an x direction and the longitudinal direction of each image column constituting each display language is the x direction, it is preferable that the longitudinal direction of the convex lens of the lenticular lens is also the x direction. As described above, in the case where the longitudinal direction of each convex lens 12A and the longitudinal direction of each image column are disposed in parallel with each other, display languages can be switched between one another as illustrated in FIGS. 1A, 1B, and 1C by changing the angle of the y direction perpendicular to the x direction (the longitudinal direction of each image column and the longitudinal direction of each convex lens) relatively to a visual line S of the observer at the time of observing the lenticular printed material 10 as illustrated in FIG. 4.

In the example illustrated in FIG. 2, 12 image columns in total, which are three sets of four image columns constituting three languages, are arranged under one convex lens 12A, but the arrangement of the image columns under each convex lens 12A is not limited to the example illustrated in FIG. 2. For example, the number of image columns arranged under one convex lens 12A is not limited to 12 and may be greater than or equal to the number of languages to be displayed. (for example, the number of columns is 3 or greater in a case where character information is displayed in three languages). Further, the resolution is improved as the number of image columns to be arranged under one convex lens 12A increases. However, since the data capacity of the image column group becomes large, the number of image columns to be arranged under one convex lens 12A is preferably 12 or less.

The angle at which character information is displayed in each language can be adjusted using the width (number of columns) of the image column group of each display language to be arranged under each convex lens 12A. For example, in a case where three display languages are switched between one another as illustrated in FIG. 1A, 1B, 1C, or 2 and the angle of observing character information displayed in the second language is expected to be increased, the number of image columns for the second language which are arranged under one convex lens 12A may be set to be larger than the number of image columns for another language. For example, the angle of observing character information displayed in the second language is increased by setting the number of image columns for the second language which are arranged under one convex lens to 6 and respectively setting the number of image columns for the first language and the number of image columns for the third language which are arranged under one convex lens to 3.

In the example of the lenticular printed material 10 illustrated in FIG. 1A, 1B, 1C, or 2, the form in which three languages are switched between one another according to the observation angle has been described, but the number of languages to be displayed is not limited as long as the number thereof is 2 or more. Further, the image columns for each language may be arranged such that four or more languages are switched between one another. In this case, the resolution is degraded as the number of display languages is increased and small characters or characters written with a narrow line become difficult to read. In addition, the observation angle for each display language becomes narrower as the number of display languages is increased, and the angle at which characters between different languages appear to overlap is likely to increase. From the viewpoints of displaying character information in a plurality of languages and maintaining high legibility, the number of languages to be switched between one another on one surface is preferably more than or equal to 3 and less than or equal to 4.

Figure 5A:
FIG. 5A is a view illustrating an example of disposing common items at the same position on a business card in which Japanese display and English display can be switched between one another.
Figure 5B:
FIG. 5B is a view illustrating an example of disposing common items at the same position on a business card in which Japanese display and English display can be switched between one another.

FIGS. 5A and 5B illustrate an example in which character information of a business card is displayed in Japanese and English by switching the languages as an example of the lenticular printed material according to the embodiment of the present invention. In Japanese display illustrated in (A) of FIG. 5A, the logo mark of the affiliated organization, the affiliated division, the title, the name, the name of the affiliated organization, the address, the phone number, the FAX number, and the E-mail address are described in order from the top. Meanwhile, in English display illustrated in (B) of FIG. 5B, the logo mark of the affiliated organization, the name, the title, the affiliated division, the name of the affiliated organization, the address, the phone number, the FAX number, and the E-mail address are described in order from the top.

In a case where display languages are different from each other as described above, the characters are different and the positions or the orders for displaying the characters are partially different from each other in some cases. However, in two display languages illustrated in FIGS. 5A and 5B, the display of the logo mark of the affiliated organization and the E-mail address is common therebetween. In addition, a part (3-1234-0000) of the phone number and a part of the FAX number (3-1234-1111) are common. Further, although not illustrated, URL is common between both languages.

In a case where common items between characters and common items between images, such as a logo mark, other than the characters in the display of different languages (hereinafter, also collectively referred to as "common items") are displayed in each language at positions different from each other on the display surface, there is a possibility that characters are difficult to read because afterimage feeling remains at the time of switching the language display and the characters are small. Here, as illustrated in (A) of FIG. 5A and (B) of FIG. 5B, it is preferable that the common items are respectively disposed so as to be displayed at the same position even in a case where the observation angle is changed. The expression "displayed at the same position" does not mean that the position is not changed at all at the time of switching the display language, but means that the apparent position is not changed, and thus the displayed characters can be recognized as the common items even in a case where two languages are displayed in a manner of overlapping each other in response to changing the observation angle. Since the site of displaying the common items does not change even in a case where the display languages are switched between one another at the time of changing the observation angle or two display languages overlap each other, the effect that the characters are easy to read can be obtained.

In a case where character information can be displayed in three or more languages, the common items are not necessarily common in all languages to be displayed, and the legibility can be improved by displaying the common items common between at least two languages at the same position. For example, in a case where display languages are Japanese, English, and Chinese and can be switched between one another, the common items which are common only between Japanese and Chinese are disposed at the same position in the Japanese display and the Chinese display, and thus the legibility can be improved.

In addition, the lenticular printed material according to the embodiment of the present invention may include images other than the character information. For example, a lenticular business card may include images of a logo mark of the organization and a photograph of a user's face other than the characters. Such images other than the character information may be set such that the images are switched between one another together with the display languages according to the observation angle or are not changed even in a case where the observation angle is changed.

The lenticular image may be formed on a recording medium disposed on the rear surface side of the lenticular lens or the lenticular image may be formed directly on the rear surface (smooth surface) of the lenticular lens. An ink receiving layer for forming a lenticular image may be provided on the smooth surface side of the lenticular lens.

For example, the lenticular printed material according to the embodiment of the present invention can be produced by forming a lenticular image, which includes character information displayed in a language intended to be displayed, on a surface of a recording medium such as paper or plastic and attaching the surface on which the lenticular image of the recording medium is formed to the surface (smooth surface) on the side opposite to the semicylindrical surface of the lenticular lens in which a plurality of convex lenses respectively having a semicylindrical surface are arranged in parallel with or without interposing a transparent adhesive layer therebetween. Here, a method of attaching the recording medium on which the lenticular image is formed to the lenticular lens is not particularly limited, and the recording medium and the lenticular lens can be attached to each other with high accuracy using methods disclosed in JP2010-250144A, JP2011-100072A, JP2010-250143A, or the like.

Further, the lenticular printed material according to the embodiment of the present invention may be in a state in which the lenticular printed material is still cut after printing and the four corners have an angle of 90 degrees or may be subjected to a treatment of rounding off or planing off the corners in order to improve the safety during handling.

The lenticular printed material according to the embodiment of the present invention may be configured such that the display language is changed from only one surface and a plain surface or a fixed image is displayed (image does not change) from the other surface. Further, the lenticular printed material may be configured such that both surfaces are respectively provided with a lenticular lens and a lenticular image and languages of displaying character information are switched between one another according to the observation angle on both surfaces. In a case of the configuration in which languages of displaying character information are switched between one another on both surfaces, the languages may be switched to the same language on both surfaces or the languages may be switched to different display languages on both surfaces. For example, in a case of a lenticular business card, character information can be displayed in six languages by disposing a lenticular lens and a lenticular image respectively on both surfaces such that languages are switched to the first to third languages on one surface and languages are switched to the fourth to sixth languages on the other surface.

Further, the lenticular business card may be configured such that the character information such as the affiliated organization or the name is displayed in three languages which are switched to the first to third languages on one surface and the advertisement related to the business contents in the affiliated organization is displayed in three languages which are switched to the first to third languages on the other surface.

In the case where character information is displayed on both surfaces, two kinds of printed materials formed by combining a lenticular lens and a lenticular image are prepared such that the intended display can be made on each of the surfaces, and the lenticular lens of each printed material may be directed to the outside and attached to each surface by interposing a layer (for example, a white layer) having a background color between two kinds of printed materials.

Further, a lenticular image in which the languages of displaying character information are switched between one another is formed on both surfaces of one sheet of paper and then a lenticular lens may be attached to both surfaces. Alternatively, a lenticular image in which the languages of displaying character information are switched between one another is formed on each smooth surface side of two sheets of lenticular lenses and then each of the lenticular lenses may be attached to both surfaces of a support such as paper having a background color.

Hereinbefore, the lenticular business card has been mainly described as an example of the lenticular printed material according to the embodiment of the present invention, but the lenticular printed material according to the embodiment of the present invention is not limited to a business card and can be applied without limitation as long as the printed material includes character information such as menus of restaurants or the like, maps, posters, route maps of transportation facilities, time tables, jackets of optical discs such as compact discs (CD), postcards, lyrics cards, product catalogs, and calendars.

EXAMPLES

Hereinafter, an embodiment of the present invention will be described in more detail with reference to examples, but the present invention is not limited to the following examples.

Example 1

(Preparation of Lenticular Business Card)

A lenticular image which changes into three languages of English, Japanese, and Chinese was offset-printed on a smooth surface side of a lenticular sheet using a lenticular sheet (lenticular lens) with high accuracy of 200 LPI, and the image was re-coated with a white ink three times by means of solid coating, thereby preparing a lenticular business card. Further, the phone number (excluding the country code) and the E-mail address were disposed so as to be displayed at the same position as common items for each country.

Example 2

A lenticular image which changes into three languages of English, Japanese, and Chinese was offset-printed on a smooth surface side of a lenticular sheet in the same manner as in Example 1 using a lenticular sheet (lenticular lens) with high accuracy of 200 LPI which was the same as in Example 1, thereby preparing a lenticular business card. Further, the phone number (excluding the country code) and the E-mail address were common items for each country, but were disposed so as to be displayed at different positions on the display surface of each language.

As a result of switching the languages to each other by changing the observation angle in the lenticular business cards respectively prepared in Examples 1 and 2, there was no afterimage feeling at the time of observing the common items and the common items were easy to read in the case of the lenticular business card of Example 1 compared to the lenticular business card of Example 2.

Example 3

A lenticular image which changes into three languages of English, Japanese, and Chinese was offset-printed on a smooth surface side of a lenticular sheet in the same manner as in Example 1 using a lenticular sheet (lenticular lens) in 60 LPI, thereby preparing a lenticular business card.

As a result of comparing the lenticular business card of Example 1 and the lenticular business card of Example 3 by changing the observation angle, characters having a font size of 8 pt or less were able to be clearly read in the case of the lenticular business card of Example 1.

Example 4

A lenticular image which changes into three languages of English, Japanese, and Chinese was directly printed on a smooth surface side of a lenticular sheet in 100 LPI using an inkjet printer UJF-6042 (manufactured by MIMAKI ENGINEERING CO., LTD.), and the image was re-coated with a white ink three times by means of solid coating, thereby preparing a lenticular business card.

Example 5

A lenticular image which changes into three languages of English, Japanese, and Chinese was printed by an inkjet printer Jet Press (registered trademark) 720 (manufactured by Fujifilm Corporation) using KASSAI (registered trademark, manufactured by Fujifilm Corporation, processed in half-kikuban) as a recording medium. Next, the surface on which the lenticular image was formed was attached to the smooth surface of the lenticular sheet in 100 LPI.

As a result of visual observation performed on the lenticular business cards respectively prepared in Examples 1, 4, and 5, even small characters were easy to read. In addition, since characters in Example 5 became no longer transparent, the characters were easy to read compared to the characters in Example 4.

Example 6

White synthetic paper provided with an adhesive layer was attached to a side (white ink side) opposite to convex lenses of the lenticular business card prepared in Example 1. In this manner, characters became no longer transparent, the characters were easy to read compared to the characters in Example 1.

Example 7

A lenticular lens was attached to both surfaces of synthetic paper formed by printing character information in Japanese, English, and Chinese on one surface and character information in Korean, German, and Arabic on the other surface, as lenticular images to prepare a lenticular business card in which three different languages were switched between one another respectively on both surfaces. In this manner, it became possible to deal with business cards in six languages with one business card.

The disclosure of JP No. 2015-134789 filed on Jul. 3, 2015 is incorporated herein by reference.

All documents, patent applications, and technical standards described in the present specification are incorporated herein by reference to the same extent as a case of being specifically and individually noted that individual documents, patent applications, and technical standards are incorporated by reference.

What is claimed is:

1. A lenticular printed material comprising:

a lenticular lens in which a plurality of convex lenses each respectively having a semicylindrical surface are arranged in parallel;

a lenticular image which is disposed on a side opposite to the semicylindrical surface of the convex lens and includes character information to be displayed in a plurality of languages independently from each other; and a white ink layer which is disposed on the lenticular image, wherein the languages for displaying the character information are switched between one another according to an observation angle in a case where the lenticular image is observed through the lenticular lens.

2. The lenticular printed material according to claim 1 which is a business card.

3. The lenticular printed material according to claim 1, wherein the character information is displayed in three or more languages that are switched between one another according to the observation angle.

4. The lenticular printed material according to claim 1, wherein the lenticular image has common items common between at least two languages among the plurality of languages, and the common items are displayed at the same position between at least two languages having the common items at the time of changing the observation angle.

5. The lenticular printed material according to claim 4, wherein the lenticular printed material is a business card, and the character information is displayed in three or more languages that are switched between one another according to the observation angle.

6. The lenticular printed material according to claim 5, wherein the convex lenses constituting the lenticular lens are arranged in parallel in an amount of at least 100 columns of per 2.54 cm.

7. The lenticular printed material according to claim 6, wherein the lenticular lens and the lenticular image are provided on both surfaces of the lenticular printed material, and the languages for displaying the character information are switched between one another according to the observation angle respectively on the both surfaces.

8. The lenticular printed material according to claim 6, wherein paper is attached to a surface on the side opposite to the semicylindrical surface of the convex lens of the lenticular lens.

9. The lenticular printed material according to claim 8, wherein the lenticular lens and the lenticular image are provided on the both surfaces, the lenticular image on one surface includes character information displayed in three languages which are switched to first to third languages according to the observation angle, and the lenticular image on the other surface includes character information displayed in three languages which are switched to fourth to sixth languages respectively different from the first to third languages according to the observation angle.

10. The lenticular printed material according to claim 1, wherein at least 100 columns of the convex lenses constituting the lenticular lens are arranged in parallel per 2.54 cm.

11. The lenticular printed material according to claim 1, wherein the lenticular lens and the lenticular image are provided on both surfaces of the lenticular printed material, and the languages for displaying the character information are switched between one another according to the observation angle respectively on the both surfaces.

12. The lenticular printed material according to claim 11, wherein the lenticular lens and the lenticular image are provided on the both surfaces, the lenticular image on one surface includes character information displayed in three languages which are switched to first to third languages according to the observation angle, and the lenticular image on the other surface includes character information displayed in three languages which are switched to fourth to sixth languages respectively different from the first to third languages according to the observation angle.

13. The lenticular printed material according to claim 1, wherein paper is attached to a surface on the side opposite to the semicylindrical surface of the convex lens of the lenticular lens.

14. A lenticular printed material comprising:

a lenticular lens in which a plurality of convex lenses each respectively having a semicylindrical surface are arranged in parallel; and a lenticular image which is disposed on a side opposite to the semicylindrical surface of the convex lens and includes character information to be displayed in a plurality of languages independently from each other, wherein the lenticular lens and the lenticular image are provided on both surfaces of the lenticular printed material, the languages for displaying the character information are switched between one another according to an observation angle respectively on the both surfaces in a case where the lenticular image is observed through the lenticular lens, the lenticular image on one surface includes character information displayed in three languages which are switched to first to third languages according to the observation angle, and the lenticular image on the other surface includes character information displayed in three languages which are switched to fourth to sixth languages respectively different from the first to third languages according to the observation angle.

15. A lenticular printed material comprising:

a lenticular lens in which a plurality of convex lenses each respectively having a semicylindrical surface are arranged in parallel in an amount of at least 100 columns of per 2.54 cm;

a lenticular image which is disposed on a side opposite to the semicylindrical surface of the convex lens and includes character information to be displayed in a plurality of languages independently from each other; and paper which is attached to a surface on the side opposite to the semicylindrical surface of the convex lens of the lenticular lens, wherein the lenticular lens and the lenticular image are provided on both surfaces of the lenticular printed material, the languages for displaying the character information are switched between one another according to an observation angle in a case where the lenticular image is observed through the lenticular lens, the lenticular image has common items common between at least two languages among the plurality of languages, and the common items are displayed at the same position between at least two languages having the common items at the time of changing the observation angle, and wherein the lenticular printed material is a business card, and the character information is displayed in three or more languages that are switched between one another according to the observation angle, the lenticular image on one surface includes character information displayed in three languages which are switched to first to third languages according to the observation angle, and the lenticular image on the other surface includes character information displayed in three languages which are switched to fourth to sixth languages respectively different from the first to third languages according to the observation angle.

* * * * *